US009886218B2

(12) United States Patent
Saisho

(10) Patent No.: US 9,886,218 B2
(45) Date of Patent: Feb. 6, 2018

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Kazuya Saisho, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 15/085,524

(22) Filed: Mar. 30, 2016

(65) Prior Publication Data

US 2016/0291677 A1    Oct. 6, 2016

(30) Foreign Application Priority Data

Apr. 3, 2015 (JP) .................................. 2015-076711

(51) Int. Cl.
*G06F 1/32* (2006.01)
*G06F 3/06* (2006.01)

(52) U.S. Cl.
CPC ............ *G06F 3/0676* (2013.01); *G06F 1/325* (2013.01); *G06F 1/3206* (2013.01); *G06F 1/3268* (2013.01); *G06F 3/0625* (2013.01); *G06F 3/0653* (2013.01); *Y02B 60/1246* (2013.01)

(58) Field of Classification Search
CPC ...... G06F 1/3268; G06F 1/3206; G06F 1/325; G06F 3/0625; G06F 3/0653; G06F 3/0676
See application file for complete search history.

(56) References Cited

U.S. PATENT DOCUMENTS

| 5,926,394 A * | 7/1999 | Nguyen .................... G06F 1/26 323/271 |
| 7,421,604 B1 * | 9/2008 | Mimberg .................. G06F 1/26 713/300 |
| 7,868,480 B2 * | 1/2011 | Miles ........................ G05F 1/56 307/43 |

FOREIGN PATENT DOCUMENTS

JP    2009-96047 A    5/2009

* cited by examiner

*Primary Examiner* — Stefan Stoynov
(74) *Attorney, Agent, or Firm* — Canon U.S.A., Inc. IP Division

(57) ABSTRACT

An information processing apparatus includes a hard disk drive and a controller that controls the hard disk drive. The information processing apparatus includes a power supply unit that supplies power to the hard disk drive, the controller, and a load resistance, a power control unit that shifts the information processing apparatus from a first power state, in which the power is supplied to the hard disk drive and the controller, to a second power state, in which the power is supplied to the hard disk drive, while limiting supply of the power to the controller that controls the hard disk drive, and a switching unit that switches between stopping supplying the power to the load resistance in the first power state and supplying the power to the load resistance in the second power state.

15 Claims, 14 Drawing Sheets

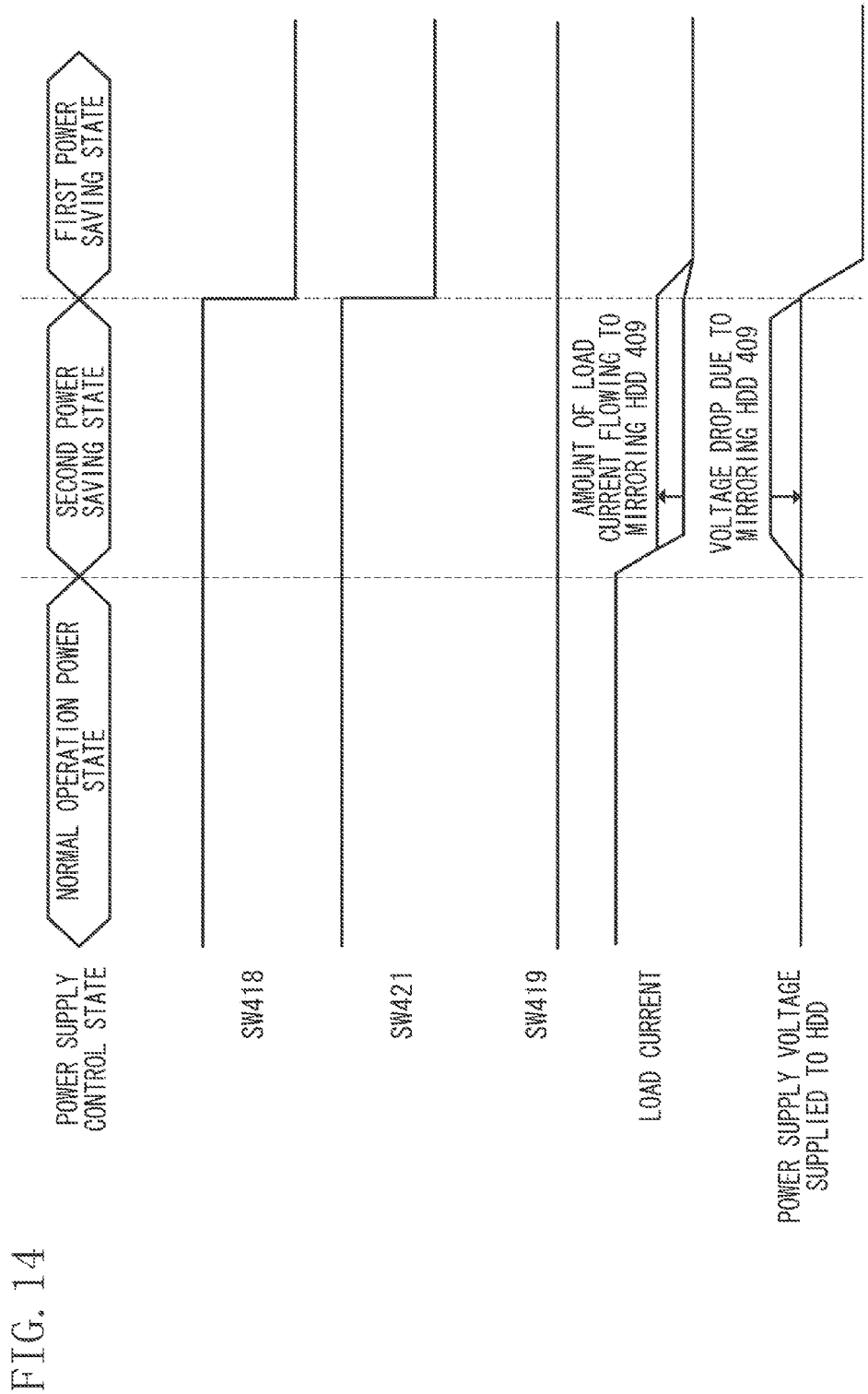

INFORMATION PROCESSING APPARATUS AND CONTROL METHOD FOR INFORMATION PROCESSING APPARATUS

BACKGROUND

Field

Aspects of the present invention generally relate to an information processing apparatus and a control method for the information processing apparatus.

Description of the Related Art

Conventional information processing apparatuses control power in some levels to reduce power consumption when not operating. As discussed in Japanese Patent Application Laid-Open No. 2009-96047, the number of power-OFFs/ONs is specified for a hard disk drive (HDD). An information processing apparatus needs to perform power control to lower the power effectively when not operating, while controlling the number of interruptions of the power to a system part including the HDD, to save the lifetime of the HDD.

In this connection, a central processing unit (CPU) is configured to count the number of power-OFFs/ONs of an HDD, and not to power off the HDD until a predetermined time elapses after a shift to a power save mode. Specifically, when not operating, an information processing apparatus shifts to a first power save mode by powering off devices including the HDD, if the number of power-OFFs/ONs of the HDD is below a specified number. If the number of power-OFFs/ONs of the HDD exceeds the specified number, the information processing apparatus shifts to a second power save mode by powering off some of the devices except for the HDD, while keeping the HDD powered on. Such a known technique can enhance power efficiency, and prevent the product lifetime of the information processing apparatus from being reduced by the lifetime of the HDD.

However, in the second power save mode, a load current decreases, and a voltage supplied to the HDD varies. Therefore, there is such an issue that an output voltage variation, which occurs due to an output current variation of a power supply device, needs to be suppressed to meet a specified input voltage for the HDD.

SUMMARY

Aspects of the present invention are generally directed to a mechanism that performs control such that a variation in a voltage value, which is applied to a part of a device group according to power saving control, does not exceed a threshold.

According to an aspect of the present invention, an information processing apparatus includes a hard disk drive and a controller that controls the hard disk drive, and the information processing apparatus includes a power supply unit configured to supply power to the hard disk drive, the controller, and a load resistance, a power control unit configured to shift the information processing apparatus from a first power state, in which the power is supplied to the hard disk drive and the controller, to a second power state, in which the power is supplied to the hard disk drive while limiting supply of the power to the controller that controls the hard disk drive, and a switching unit configured to switch between stopping supplying the power to the load resistance in the first power state and supplying the power to the load resistance in the second power state.

Further features of aspects of the present invention will become apparent from the following description of exemplary embodiments with reference to the attached drawings.

BRIEF DESCRIPTION OF THE DRAWINGS

FIG. 14 is a timing chart illustrating a power supply state of the controller unit.

DESCRIPTION OF THE EMBODIMENTS

Exemplary embodiments of the present invention will be described with reference to the drawings.

[Description of System Configuration]

Figure 1:
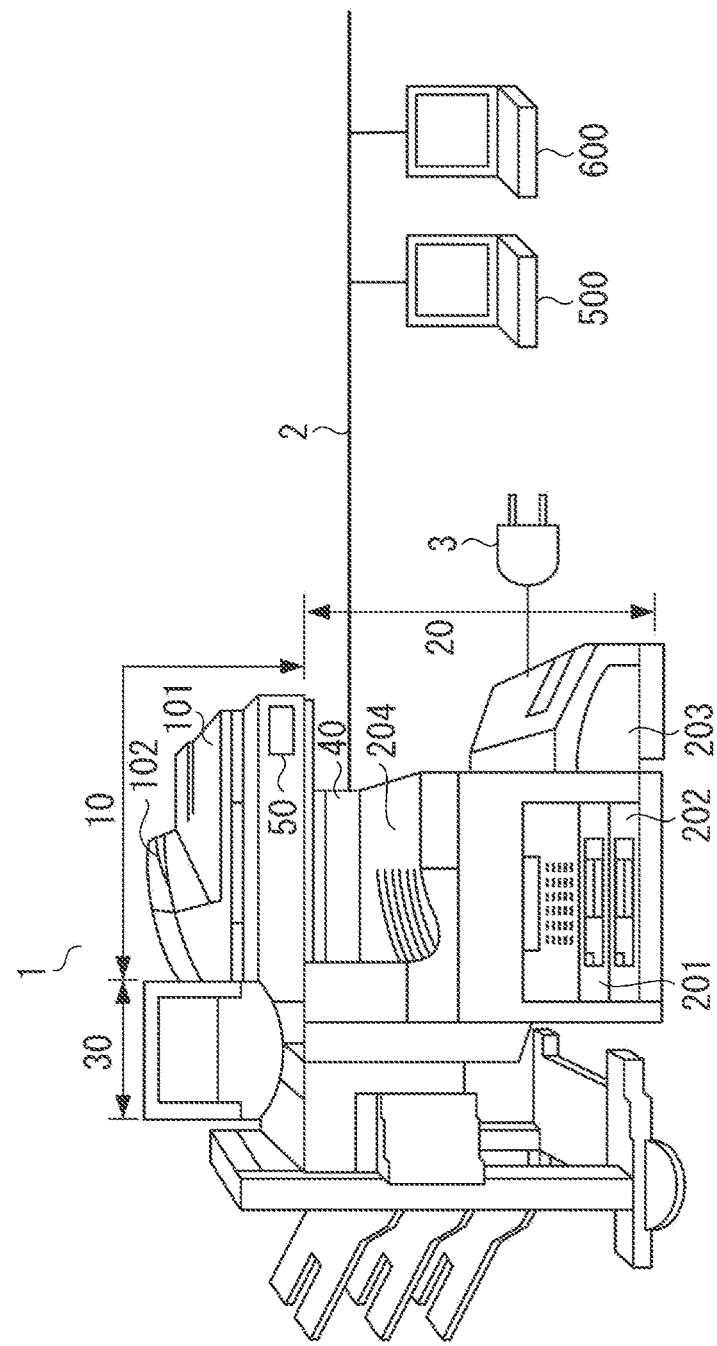
FIG. 1 is a diagram illustrating a configuration of a system to which an information processing apparatus is applied.

FIG. 1 is a diagram illustrating a configuration of a system to which an information processing apparatus according to a first exemplary embodiment is applied. This example is an information processing apparatus in which an image formation apparatus includes a power supply device and a hard disk drive (HDD), and is connected to a network 2 to communicate with a personal computer (PC) 500 and a print server 600 that are provided outside. Examples of the information processing apparatus include an image formation apparatus, a multifunction image formation apparatus, and a printing apparatus.

In FIG. 1, an image formation apparatus 1 includes a scanner unit 10 serving as an image input device, a printer unit 20 serving as an image output device, an operation unit 30 serving as a user interface, and a controller unit 40 controlling the entire image formation apparatus 1. The image formation apparatus 1 further includes an outlet 3 serving as a source for supplying power to the image formation apparatus 1, and a main switch 50 for supplying the power to the image formation apparatus 1.

The scanner unit 10 obtains reflected light by performing scanning exposure on an image on a document, and inputs the reflected light to a charge coupled device (CCD), thereby converting information of the image into an electrical signal. Further, the scanner unit 10 converts the electrical signal into a luminance signal of each of R, G, and B colors, and outputs the luminance signal to the controller unit 40 as image data.

Documents are set on a tray 102 of a document feeder 101. When a user instructs start of scanning from the operation unit 30, the controller unit 40 provides a document scanning instruction to the scanner unit 10. Upon receipt of this instruction, the scanner unit 10 performs document-scanning operation, by feeding documents one by one from the tray 102 of the document feeder 101.

The printer unit 20 is an image forming device, which forms image data received from the controller unit 40, on a sheet. The printer unit 20 includes sheet cassettes 201, 202, and 203 that allow selections from different paper sizes and different sheet orientations. The sheet is output to a paper discharge tray 204, after the printing has been performed thereon.

The controller unit 40 controls the operation of the image formation apparatus 1, and performs transmission and reception of data, conversion of data, and power control. Further, the controller unit 40 is connected, via the network 2, to the PC 500 and the print server 600 provided outside.

Figure 2:
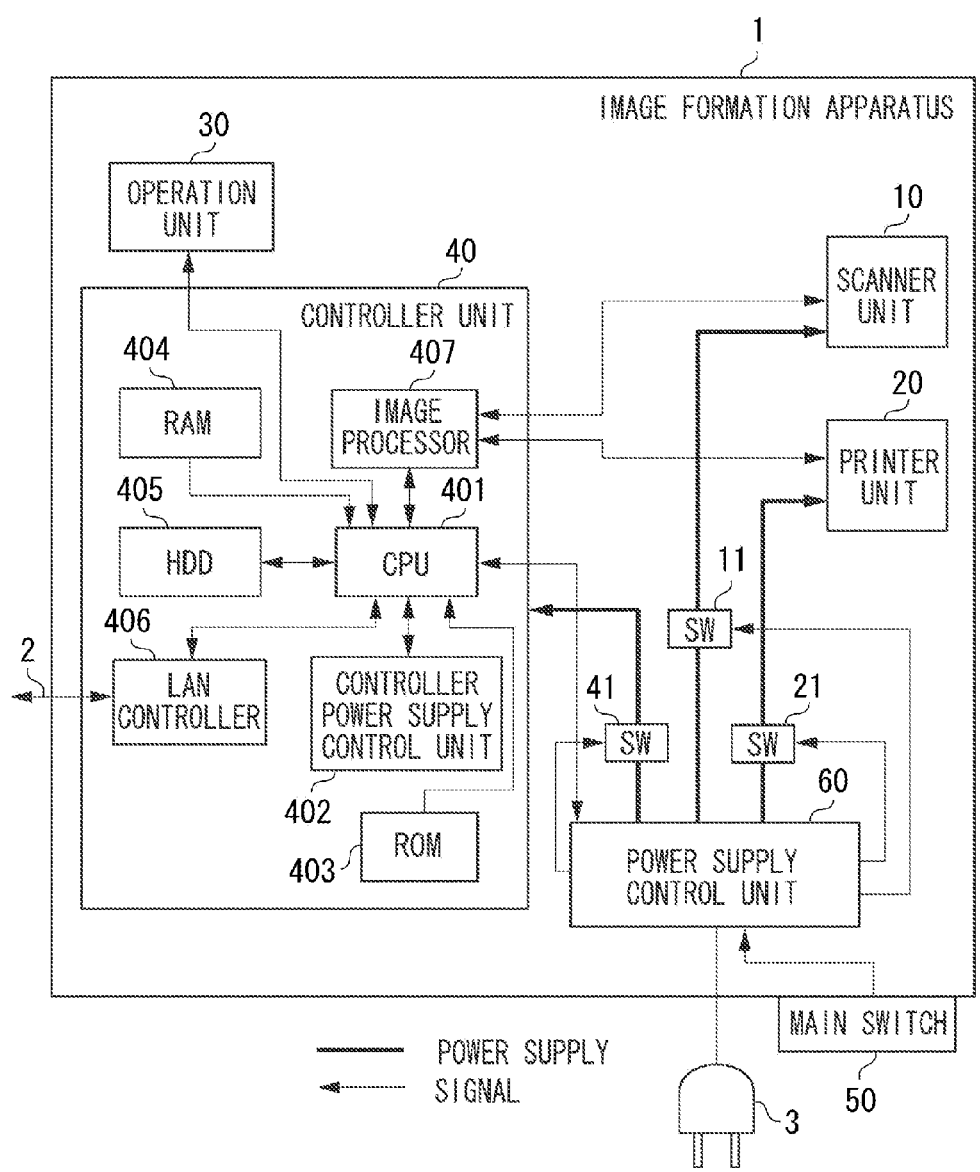
FIG. 2 is a block diagram illustrating an inner configuration of an image formation apparatus.

FIG. 2 is a block diagram illustrating an inner configuration of the image formation apparatus 1 illustrated in FIG. 1.

In FIG. 2, a power supply control unit 60 supplies the power to the controller unit 40, the scanner unit 10, and the printer unit 20, by controlling OFF/ON of switches (SWs) 41, 11, and 21. In the controller unit 40, a central processing unit (CPU) 401 comprehensively controls access to various devices being in connection based on programs such as a control program stored in a read only memory (ROM) 403, and also comprehensively controls various kinds of processing performed in the controller unit 40.

A controller power supply control unit 402 generates power to be supplied to the controller unit 40 from the power supplied from the power supply control unit 60, and controls power-ON/OFF. The details will be described below with reference to FIG. 3. A random access memory (RAM) 404 serves as a system work memory for operation of the CPU 401, and also serves as a memory provided to store image data temporarily. The RAM 404 is configured of a dynamic random access memory (DRAM) in which stored information is erased after power-OFF.

The ROM 403 stores programs such as a boot program for the image formation apparatus 1. An HDD 405 is a hard disk drive capable of storing system software and image data. A local area network (LAN) controller 406 is connected to the network 2 (LAN), and controls input/output of information. An image processor 407 is provided to perform image processing. The image processor 407 can read the image data stored in the RAM 404, and perform image processing such as enlargement/reduction of data complying with Joint Photographic Experts Group (JPEG) or Joint Bi-level Image Experts Group (JBIG), and color adjustment. The image processor 407 performs correction, modification, and editing of image data received from the scanner unit 10, and then outputs the image data to the printer unit 20.

Figure 3:
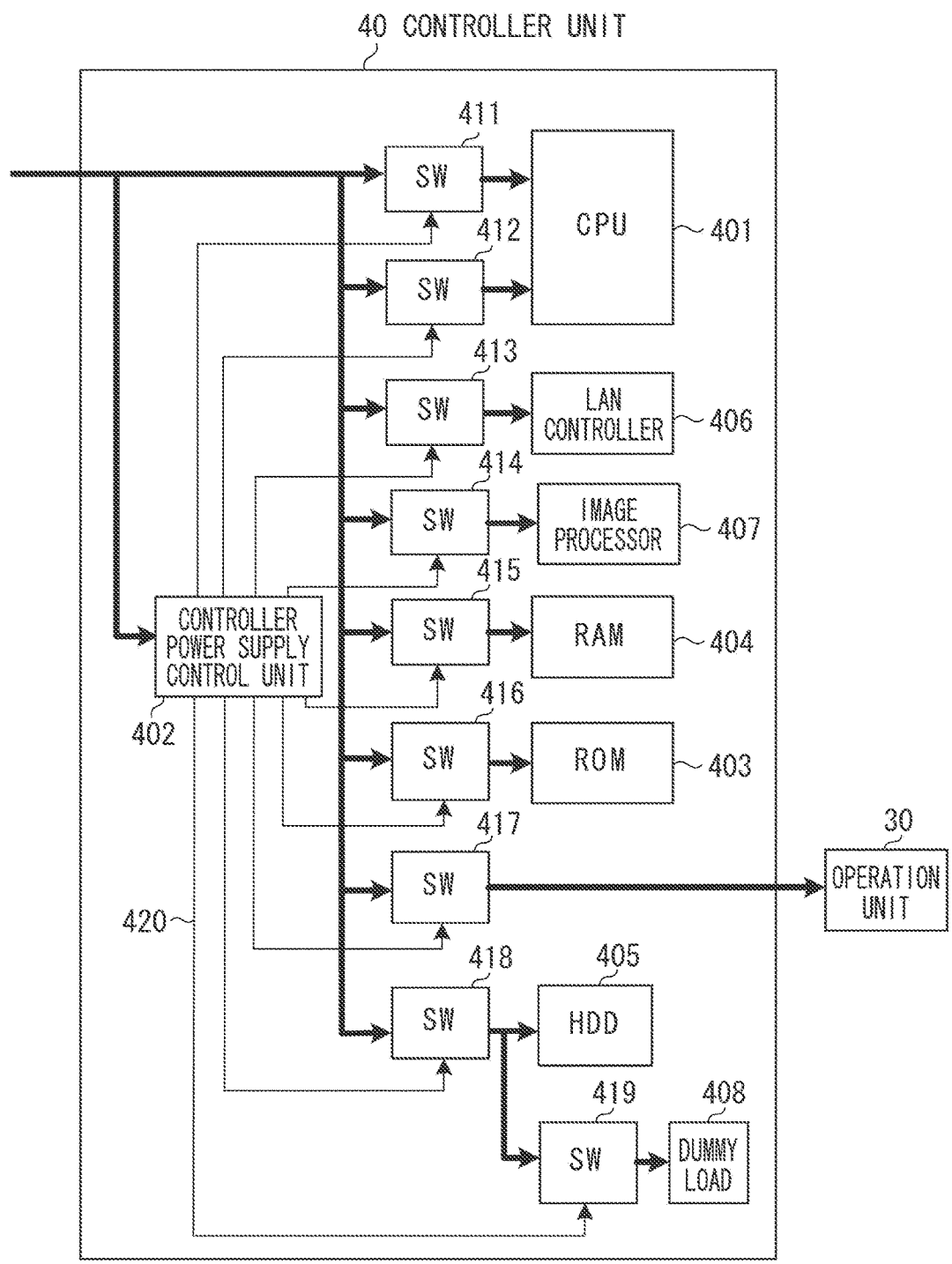
FIG. 3 is a block diagram illustrating a configuration of a controller unit.

FIG. 3 is a block diagram illustrating a configuration of the controller unit 40 illustrated in FIG. 2. In the present exemplary embodiment, the controller power supply control unit 402 performs control for shifting to a first power state of supplying the power to a plurality of devices or a second power state of supplying the power to a part of the plurality of devices, in the following configuration.

In FIG. 3, the controller power supply control unit 402 controls ON/OFF of SWs 411 to 419. The controller power supply control unit 402 thereby controls the power supply to the CPU 401, the LAN controller 406, the image processor 407, the RAM 404, the ROM 403, the operation unit 30, the HDD 405, and a dummy load 408. There are two channels of power supply to the CPU 401, i.e., the power supply controlled with the SW 411 for supplying the power even in a power saving state to be described below, and the power supply controlled with the SW 412 for interrupting the power in the power saving state. Here, the dummy load 408 includes, for example, a circuit in which a fixed resistance is connected between the SW 419 and a ground.

In the present exemplary embodiment, the dummy load 408 is provided as a load device for suppressing a variation in a power supply voltage applied to a part of a plurality of devices, when the controller power supply control unit 402 causes a shift from the first power state to the second power state. The variation in the power supply voltage occurs due to a variation in a current. The controller power supply control unit 402 controls the SW 419, thereby performs ON/OFF of the power to be applied to the dummy load 408.

[Description of Processing Operation Flow]

When the image formation apparatus 1 executes a SEND operation for transmitting data, the user sets a document at the scanner unit 10, and then provides an instruction for starting a scanning operation after setting the scanning operation by operating a button while referring to a screen of the operation unit 30.

The scanner unit 10 then optically scans the document and converts the scanned document into image data under the control of the controller unit 40. The image data is then transferred to the controller unit 40, and the image processor 407 performs the image processing on the received image data. The CPU 401 then temporarily stores the image data in the HDD 405. Then, the CPU 401 instructs the LAN controller 406 to transfer the stored image data, via the network 2, to a transmission destination specified beforehand at the operation unit 30.

When the image formation apparatus 1 executes a copy operation, the user sets a document at the scanner unit 10, and then provides an instruction for starting the copy operation after setting the copy operation by operating a button while referring to the screen of the operation unit 30. The scanner unit 10 then optically scans the document and converts the scanned document into image data under the control of the controller unit 40. The image data is then transferred to the controller unit 40, and the image processor 407 converts the received image data into a print image format. The CPU 401 then temporarily stores the image data in the HDD 405. Then, the CPU 401 transfers the image data stored in the HDD 405 to the image processor 407, and the image processor 407 transfers the received image data to the printer unit 20. The printer unit 20 prints the received image data on a recording sheet, and outputs the recording sheet to the outside of the image formation apparatus 1.

Further, when the image formation apparatus 1 executes a print operation, the user inputs a print job from the PC 500 provided outside, and the print job is received via the print server 600, the network 2, and the LAN controller 406. The image processor 407 then converts the input print job into a print image format, and subsequently, the CPU 401 temporarily stores image data in the HDD 405. Then, the CPU 401 transfers the image data stored in the HDD 405 to the image processor 407, and the image processor 407 transfers the received image data to the printer unit 20. The printer unit 20 prints the received image data on a recording sheet, and outputs the recording sheet to the outside of the image formation apparatus 1.

[Description of Power Control]

Figure 4:
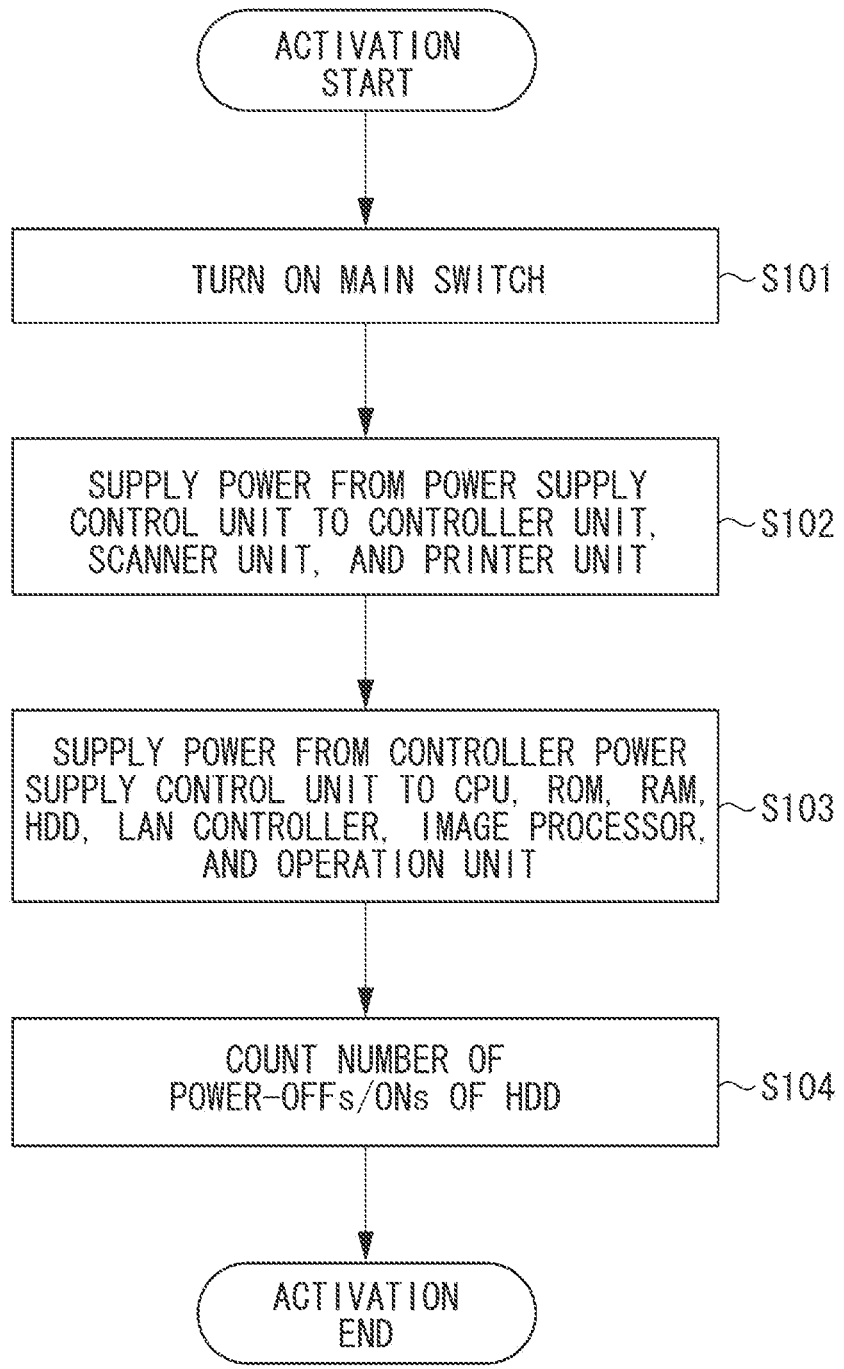
FIG. 4 is a flowchart illustrating a control method for the information processing apparatus.

FIG. 4 is a flowchart illustrating a control method for the information processing apparatus according to the present exemplary embodiment. This is a power control example when the image formation apparatus 1 illustrated in FIG. 1 is activated.

In step S101, a user turns on the main switch 50, thereby causing the power supply control unit 60 to generate power necessary for the controller unit 40, the scanner unit 10, and the printer unit 20, using the power supplied from the outlet 3. In step S102, the controller power supply control unit 402 supplies the power by turning on the SW 41, the SW 11, and the SW 21. Further, in the controller unit 40, the controller power supply control unit 402 generates power necessary for the CPU 401, the ROM 403, the RAM 404, the HDD 405, the LAN controller 406, the image processor 407, and the operation unit 30. In step S103, the controller power supply control unit 402 supplies the power by turning on the SW 411 to the SW 418. A normal state (hereinafter referred to as a "normal operation power state") is thus established. In step S104, the CPU 401 counts the number of power-OFFs/ONs of the HDD 405, and ends this activation processing.

Figure 5:
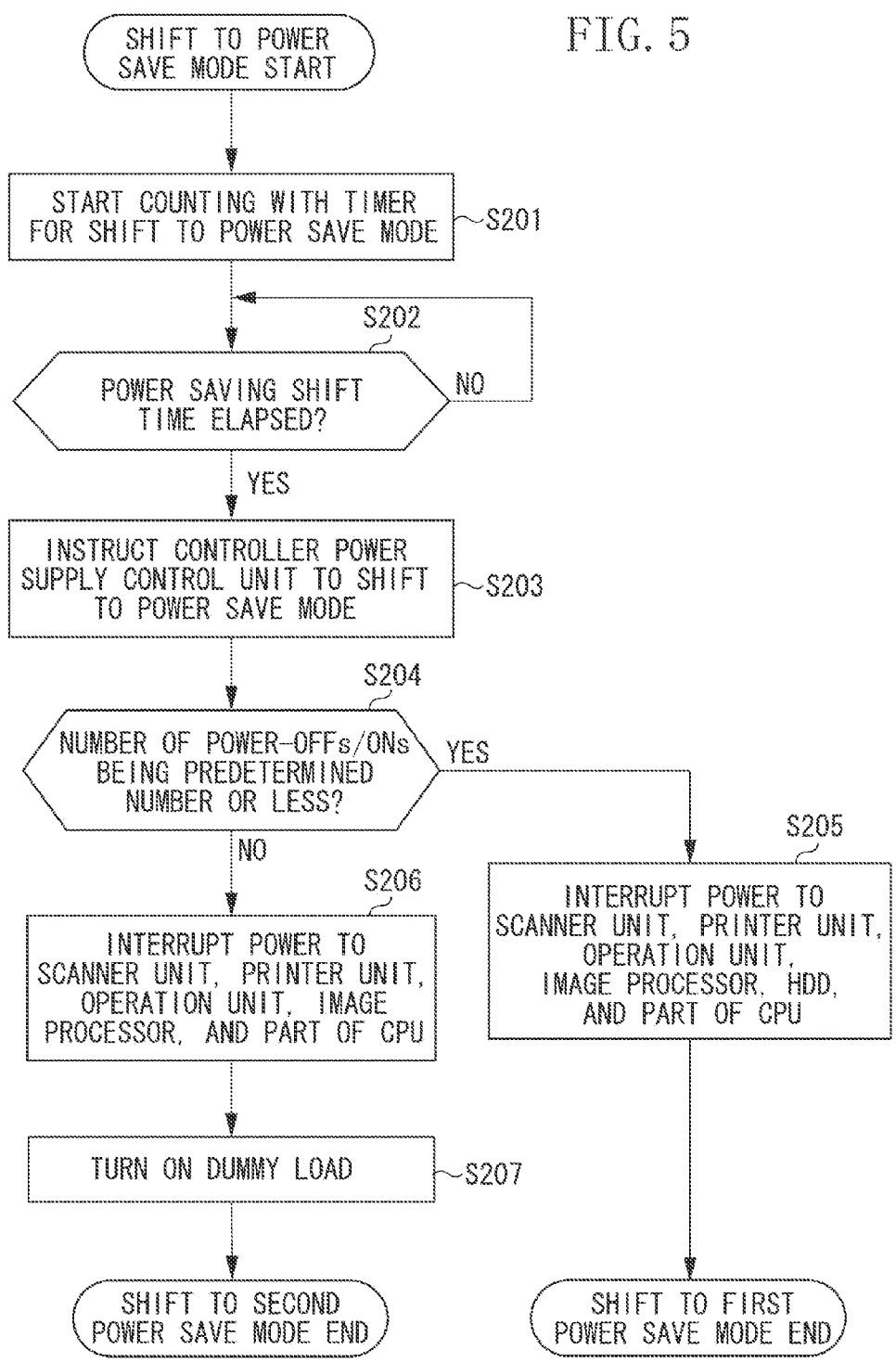
FIG. 5 is a flowchart illustrating the control method for the information processing apparatus.

FIG. 5 is a flowchart illustrating the control method for the information processing apparatus according to the present exemplary embodiment. This is a power control example in which the image formation apparatus 1 illustrated in FIG. 1 shifts from a normal state to a power save mode. In step S201, after the image formation apparatus 1 enters a non-operating state, a timer (not illustrated) of the CPU 401 starts counting. In step S202, it is determined whether a preset or user-set time (hereinafter referred to as "power saving shift time") has elapsed. If the power saving shift time has elapsed (Yes in step S202), then in step S203, the CPU 401 instructs the controller power supply control unit 402 to shift the image formation apparatus 1 to the power save mode (a low power state).

In step S204, the CPU 401 determines whether the number of power-OFFs/ONs of the HDD 405 counted in step S104 exceeds an upper limit for the number of power-OFFs/ONs of the HDD 405 in a predetermined main-body lifetime (e.g., five years). When the CPU 401 determines that the number of power-OFFs/ONs (an ON number or OFF number) of the HDD 405 does not exceed the upper limit (Yes in step S204), the processing proceeds to step S205.

In step S205, the CPU 401 instructs the controller power supply control unit 402 to interrupt the power supply to the scanner unit 10 and the printer unit 20 by the power supply control unit 60, the operation unit 30, the image processor 407, and the HDD 405, and to interrupt the power to a part of the CPU 401. This results in a state that will be hereinafter referred to as "a first power saving state".

On the other hand, when the CPU 401 determines that the number of power-OFFs/ONs (the ON/OFF number) of the HDD 405 exceeds the upper limit (a limit value) (No in step S204), the processing proceeds to step S206. In step S206, the CPU 401 instructs the controller power supply control unit 402 to interrupt the power to the scanner unit 10 and the printer unit 20 by the power supply control unit 60, the operation unit 30, and the image processor 407, and to interrupt the power to the part of the CPU 401. This results in a state that will be hereinafter referred to as "a second power saving state".

Further, in step S207, the CPU 401 instructs the controller power supply control unit 402 to turn on the SW 419 to connect the dummy load 408. In this process, the controller power supply control unit 402 turns on the SW 419 by controlling a dummy load SW control signal 420, and then this processing ends.

Figure 6:
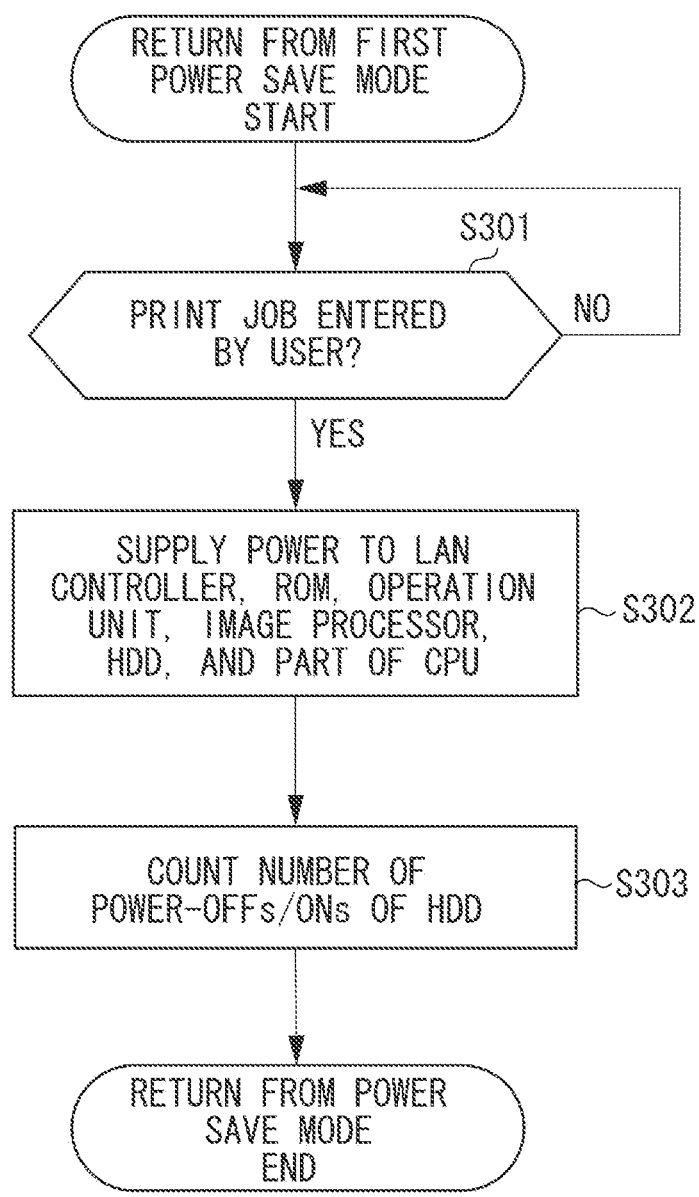
FIG. 6 is a flowchart illustrating the control method for the information processing apparatus.

FIG. 6 is a flowchart illustrating the control method for the information processing apparatus according to the present exemplary embodiment. This is a power control example in which the image formation apparatus 1 returns from the first power save mode.

In step S301, it is determined whether a print job is supplied by a user from the PC 500 provided outside. When the print job is supplied (Yes in step S301), the power supply control unit 60 generates the power necessary for the scanner unit 10 and the printer unit 20 from the power supplied from the outlet 3, and supplies the generated power by turning on the SW 11 and the SW 21.

Further, in the controller unit 40, the controller power supply control unit 402 turns on the SW 412, the SW 413, the SW 414, the SW 416, the SW 417, and the SW 418. Therefore, in step S302, the power is supplied to the part of the CPU 401, the LAN controller 406, the image processor 407, the ROM 403, the operation unit 30, and the HDD 405. In step S303, the CPU 401 counts the number of power-OFFs/ONs of the HDD 405, and then this processing ends.

Figure 7:
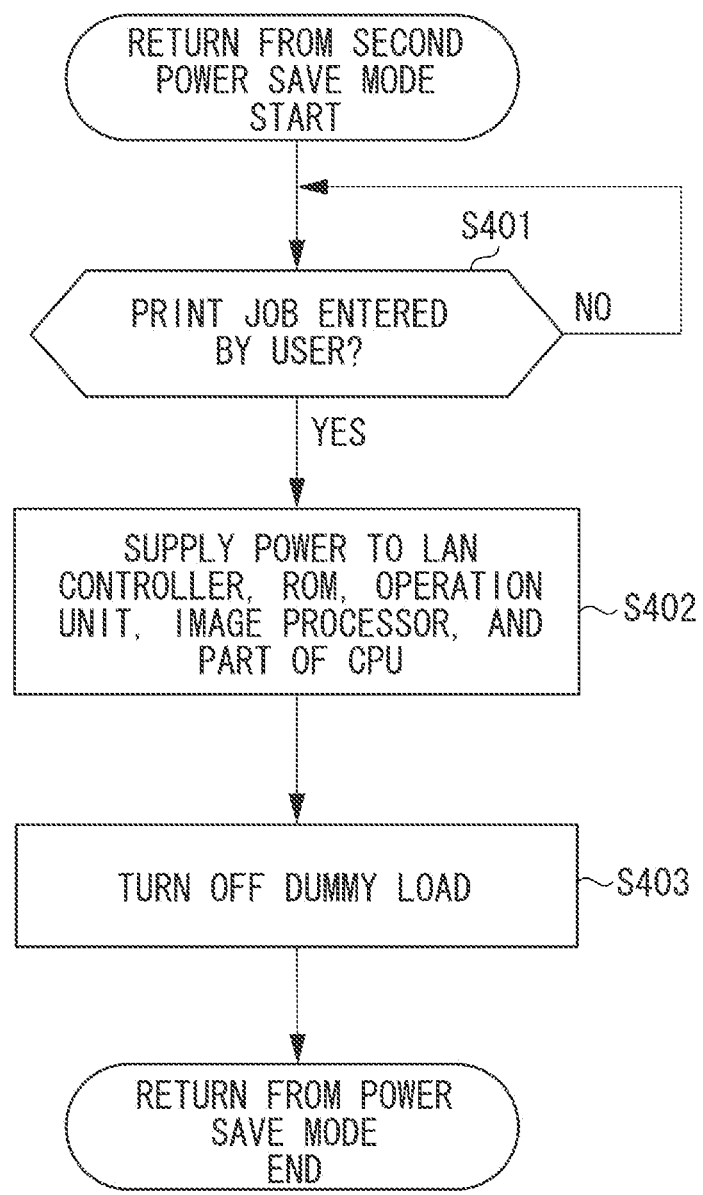
FIG. 7 is a flowchart illustrating the control method for the information processing apparatus.

FIG. 7 is a flowchart illustrating the control method for the information processing apparatus according to the present exemplary embodiment. This is a power control example in which the image formation apparatus 1 returns from the second power save mode.

In step S401, it is determined whether a print job is supplied by a user from the PC 500 provided outside. When the print job is supplied (Yes in step S401), the power supply control unit 60 generates, from the power supplied from the outlet 3, the power necessary for the scanner unit 10 and the printer unit 20, and supplies the generated power by turning on the SW 11 and the SW 21. Further, in the controller unit 40, the controller power supply control unit 402 turns on the SW 412, the SW 413, the SW 414, the SW 416, and the SW 417. As a result, in step S402, the power is supplied to the part of the CPU 401, the LAN controller 406, the image processor 407, the ROM 403, and the operation unit 30. In step S403, the CPU 401 instructs the controller power supply control unit 402 to turn off the SW 419 to interrupt the power to the dummy load 408, and then this processing ends.

Figure 8:
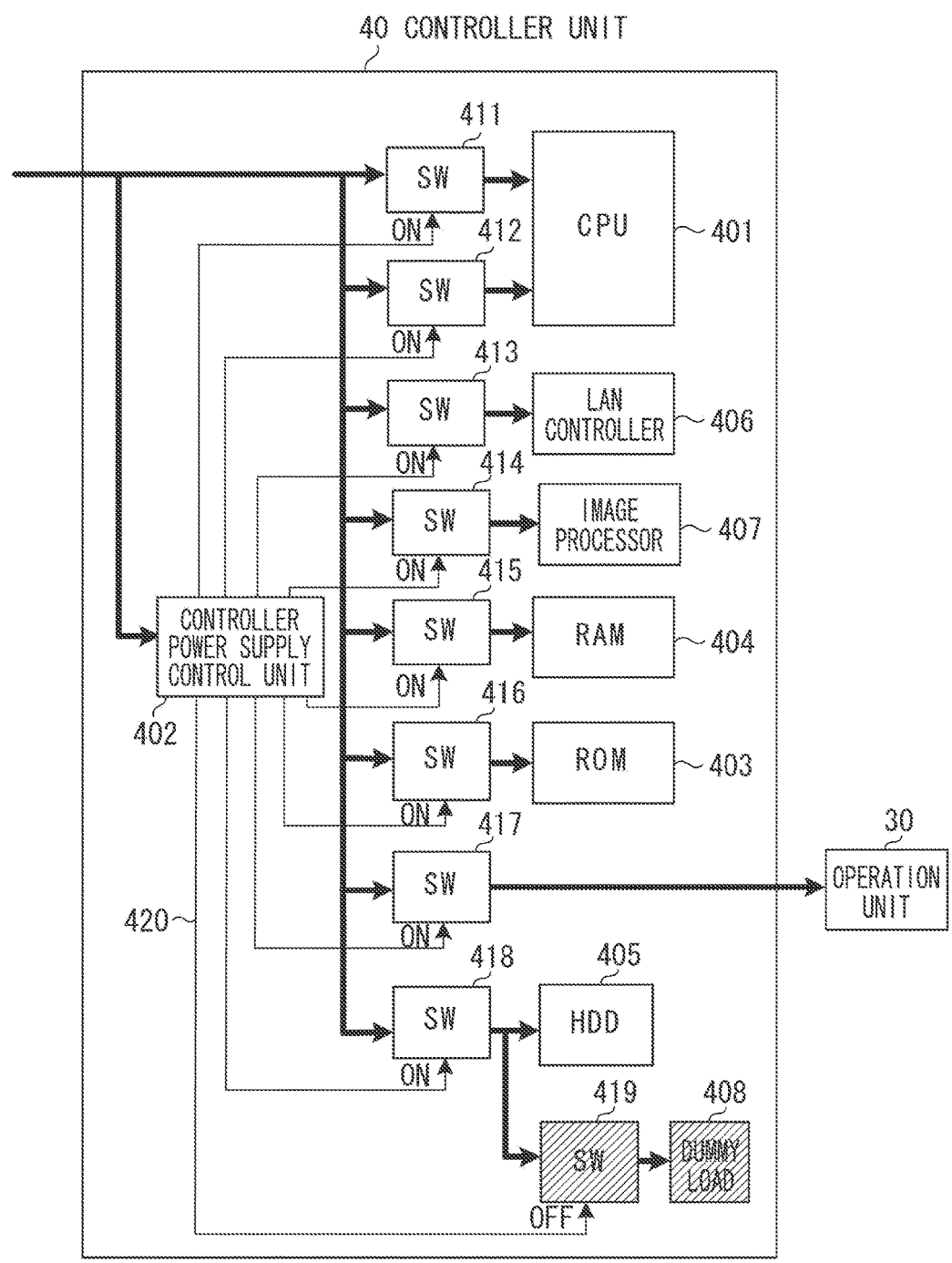
FIG. 8 is a block diagram illustrating a power supply state of the information processing apparatus.
Figure 9:
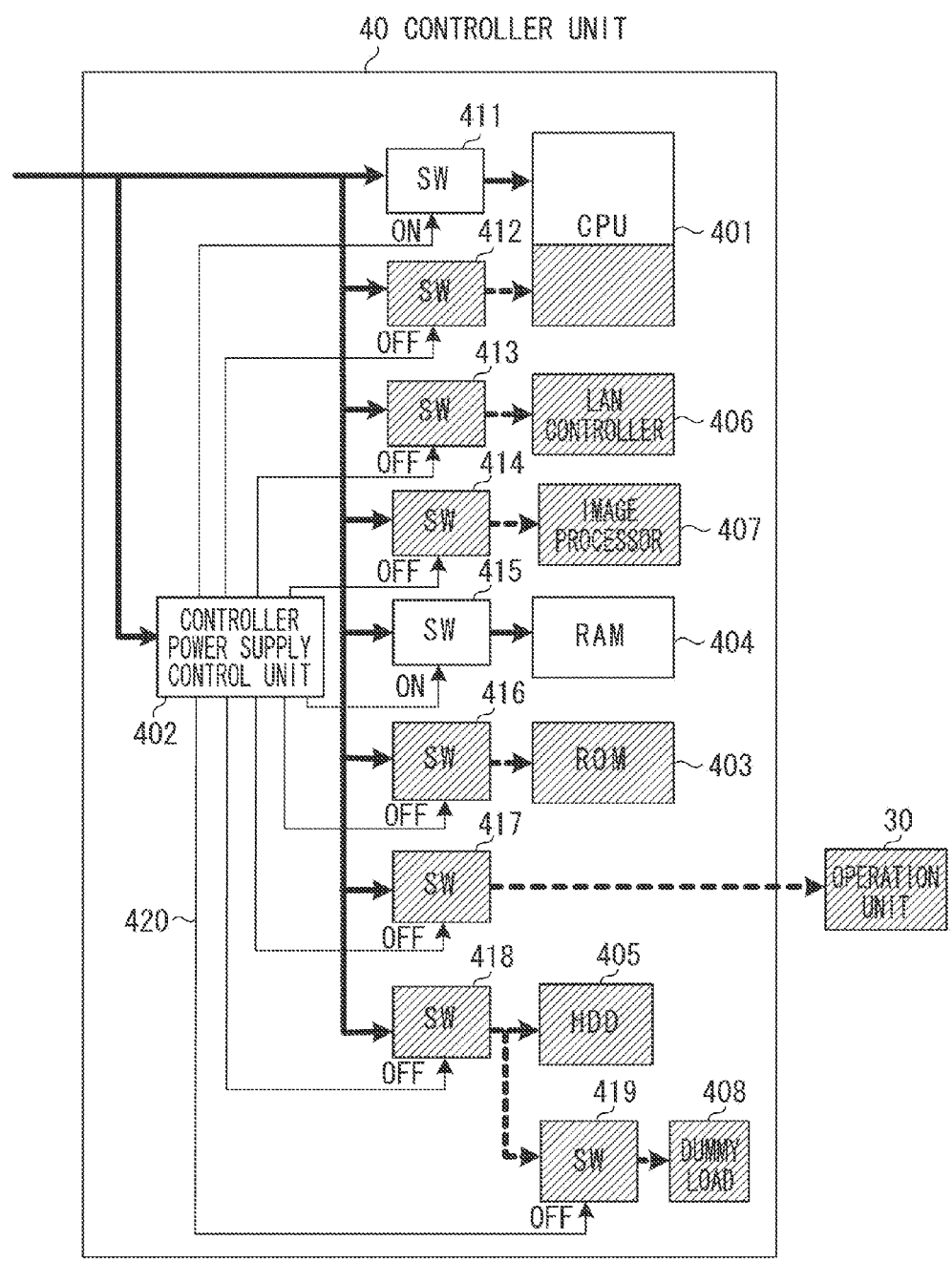
FIG. 9 is a block diagram illustrating a power supply state of the information processing apparatus.
Figure 10:
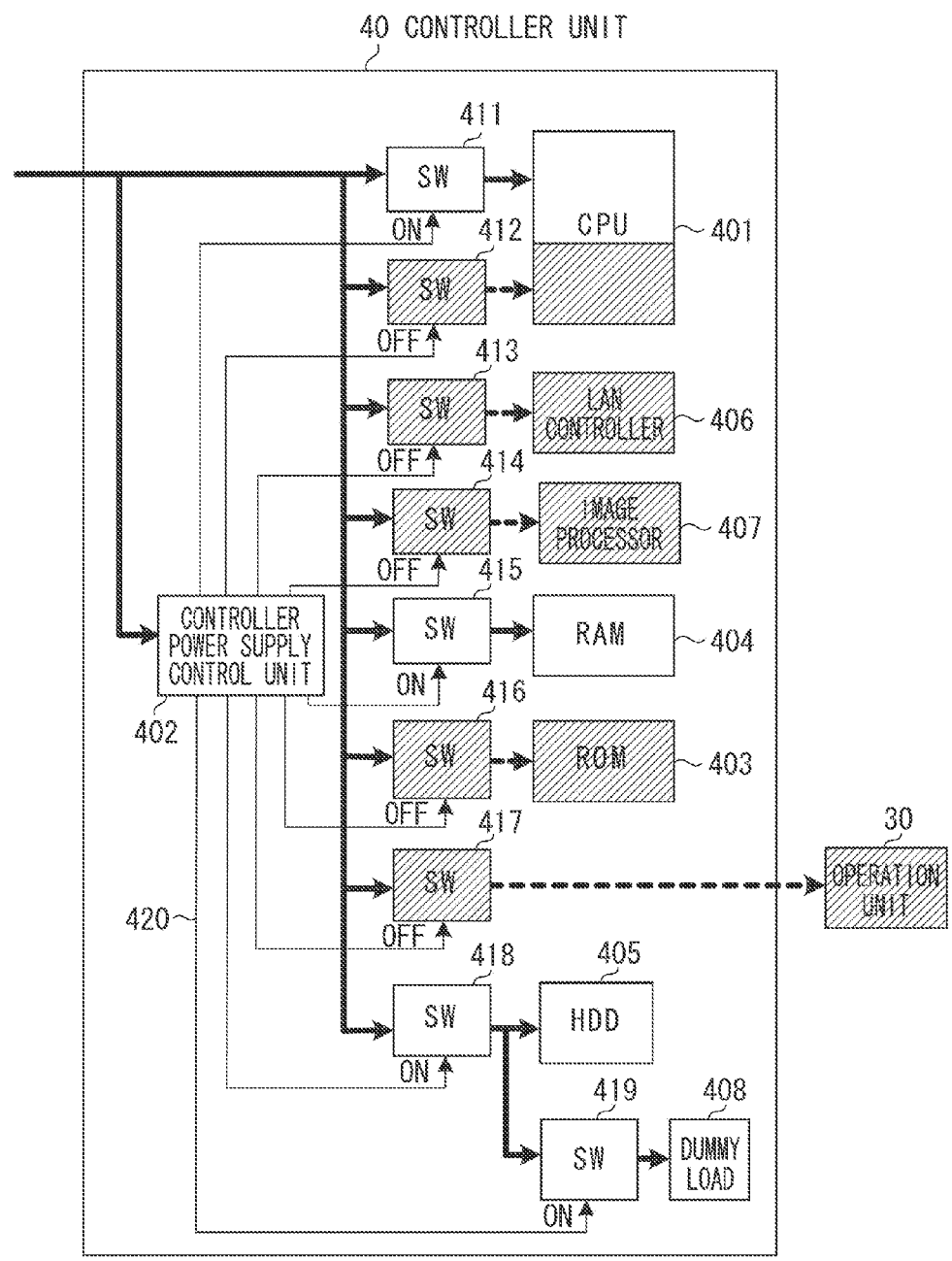
FIG. 10 is a block diagram illustrating a power supply state of the information processing apparatus.

FIGS. 8 to 10 are diagrams each illustrating a power supply state of the information processing apparatus according to the present exemplary embodiment. In FIG. 8, the controller unit 40 is in the above-described normal operation power state, and a shaded area is not supplied with the power.

In FIG. 8, when the controller power supply control unit 402 is activated by being supplied with the power, the SW 416 connected to the ROM 403 is turned on, thereby activating the ROM 403. This starts a boot program for operation of the CPU 401. Here, the SW is configured of, for example, a switching field effect transistor (FET). Then, the SW 411 and the SW 412 connected to the CPU 401, as well as the SW 415 and the SW 418 connected to the RAM 404 and the HDD 405, respectively, are turned on, so that the CPU 401, the RAM 404, and the HDD 405 are activated.

The CPU 401 thereby starts an operating system (OS) stored in the HDD 405, and uses the RAM 404 as the system work memory. Further, the SW 413, the SW 414, and the SW 417 connected to the LAN controller 406, the image processor 407, and the operation unit 30, respectively, are turned on, so that the LAN controller 406, the image processor 407, and the operation unit 30 are activated. This causes a shift to a standby state for processing an input job or an instruction input into the operation unit 30 by the user.

Since the SW 411 to the SW 418 are in an ON state, the power is supplied to the CPU 401, the LAN controller 406, the image processor 407, the RAM 404, the ROM 403, the operation unit 30, and the HDD 405. Therefore, a load current is sufficiently large. Accordingly, the CPU 401 instructs the controller power supply control unit 402 to bring the SW 419 connected to the dummy load 408 into an OFF state. In response to this instruction, the controller power supply control unit 402 turns off the SW 419, by controlling the dummy load SW control signal 420.

In FIG. 9, the controller unit 40 illustrated in FIG. 3 is in the first power saving state (the first power state) described above.

When shifting to the first power saving state in step S205 of FIG. 5, the controller power supply control unit 402 interrupts the power to the ROM 403, the HDD 405, the LAN controller 406, the image processor 407, and the operation unit 30, and interrupts the power to the part of the CPU 401. In this state, since the power to the HDD 405 is OFF, the CPU 401 instructs the controller power supply control unit 402 to bring the SW 419 connected to the dummy load 408 into the OFF state. In response to this instruction, the controller power supply control unit 402 turns off the SW 419, by controlling the dummy load SW control signal 420.

In FIG. 10, the controller unit 40 illustrated in FIG. 3 is in the second power saving state (the second power state) described above.

When shifting to the second power saving state in step S206 of FIG. 5, the CPU 401 instructs the controller power supply control unit 402 to interrupt the power to the ROM 403, the LAN controller 406, the image processor 407, and the operation unit 30, and also to interrupt the power to the part of the CPU 401. Since the SW 412, the SW 413, the SW 414, the SW 416, and the SW 417 are in the OFF state, the power is not supplied to the CPU 401, the LAN controller 406, the image processor 407, the ROM 403, and the operation unit 30. In this example, the power supply to the devices, except for the dummy load 408 and the hard disk drive (the HDD 405), is stopped.

Therefore, the load current is small and thus, the voltage supplied to the HDD 405 may exceed a specified input voltage for the HDD 405. For this reason, the CPU 401 instructs the controller power supply control unit 402 to turn on the SW 419 connected to the dummy load 408. In response to this instruction, the controller power supply control unit 402 turns on the SW 419 by controlling the dummy load SW control signal 420, thereby suppressing a variation in the load current.

[Description of Dummy Load Control]

Figure 11:
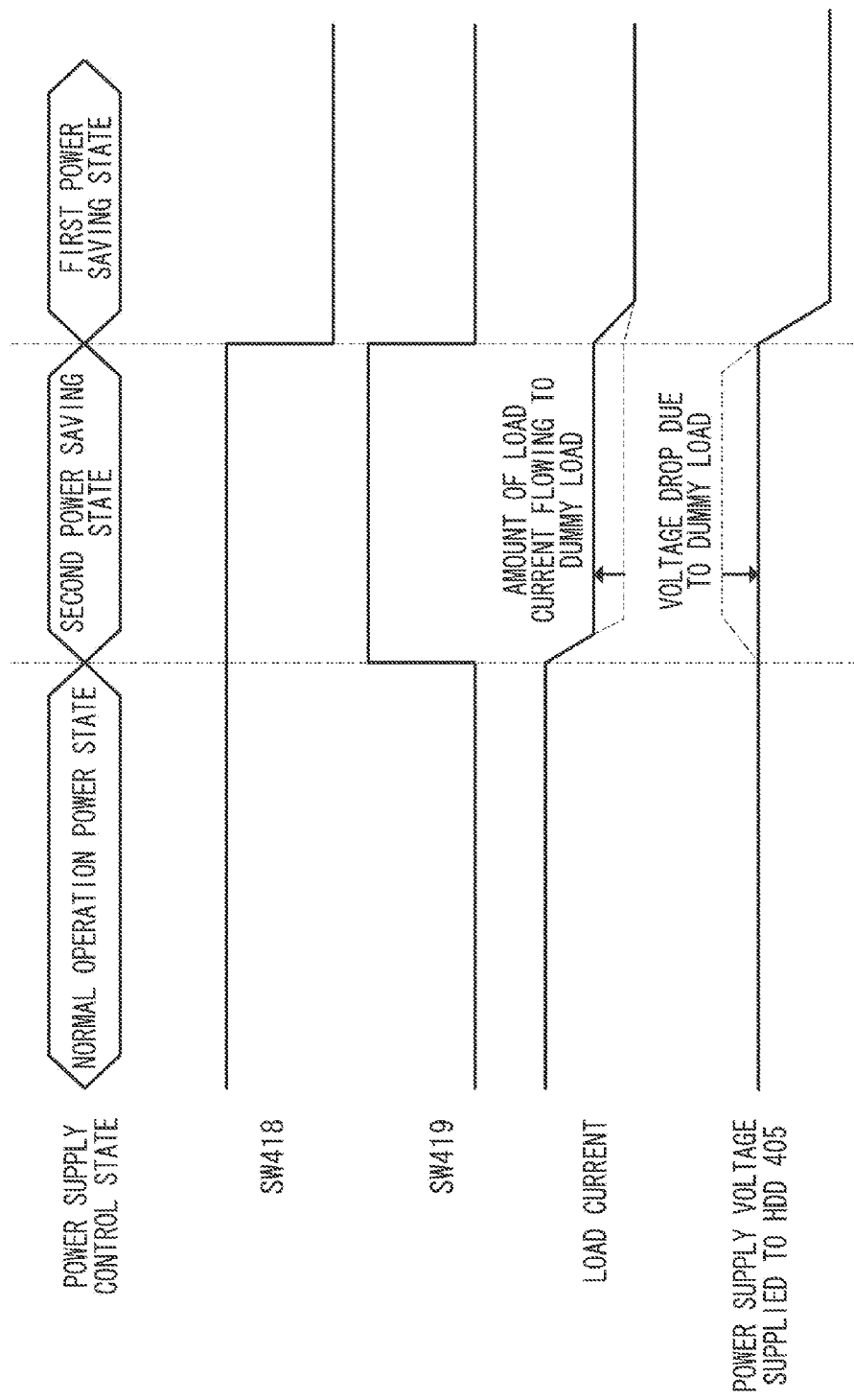
FIG. 11 is a timing chart illustrating a power supply state of the controller unit.

FIG. 11 is a timing chart illustrating a power supply control state of the controller unit 40 illustrated in FIG. 3. This is an example of the relationship between the voltage supplied to the HDD 405 according to the power control state and the control of the dummy load 408.

In the above-described normal operation power state, the SW 418 is in the ON state, and therefore, a power supply voltage is supplied to the HDD 405. In this state, since the SW 411 to the SW 418 are in the ON state, the power is supplied to the CPU 401, the LAN controller 406, the image processor 407, the RAM 404, the ROM 403, the operation unit 30, and the HDD 405. Therefore, the load current is sufficiently large and thus, the power supply voltage supplied to the HDD 405 does not exceed the specified input voltage for the HDD 405.

After a shift to the above-described second power saving state occurs, the SW 418 remains in the ON state, and accordingly, supplying the power supply voltage to the HDD 405 continues. In this state, the load current in the entire controller unit 40 is small (as indicated by a broken line) and thus, the voltage supplied to the HDD 405 may exceed the specified input voltage (as indicated by a broken line). Therefore, the voltage supplied to the HDD 405 is controlled not to exceed the specified input voltage, by increasing the load current. This increase in the load current is achieved by connecting the dummy load 408 by turning on the SW 419.

Based on the foregoing, a variation in the load current when the power is supplied to the part of the plurality of devices can be suppressed, and therefore, the specified input voltage for the HDD 405 can be satisfied in a simple circuit configuration. In the first exemplary embodiment, a target for suppressing a load current variation is the HDD 405, but any device in which a load current variation occurs may be the target.

Figure 12:
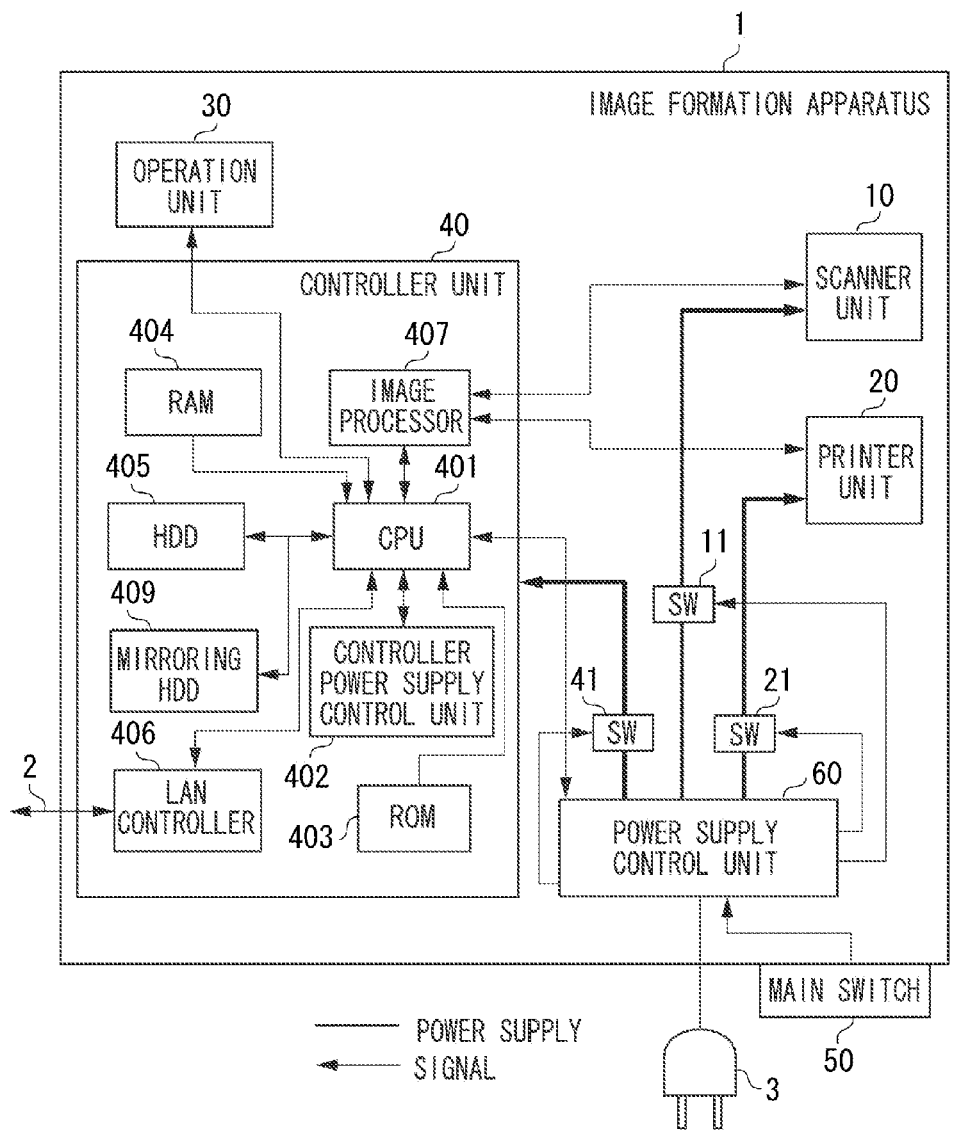
FIG. 12 is a block diagram illustrating a configuration of a controller unit.

FIG. 12 is a block diagram illustrating a configuration of an information processing apparatus according to a second exemplary embodiment. This is an example in which two HDDs, i.e., the HDD 405 and a mirroring HDD 409, are provided to establish mirroring connection.

In FIG. 12, the mirroring HDD 409 stores the same data as the image data stored in the HDD 405, serving as backup data to be used when the HDD 405 is down.

Figure 13:
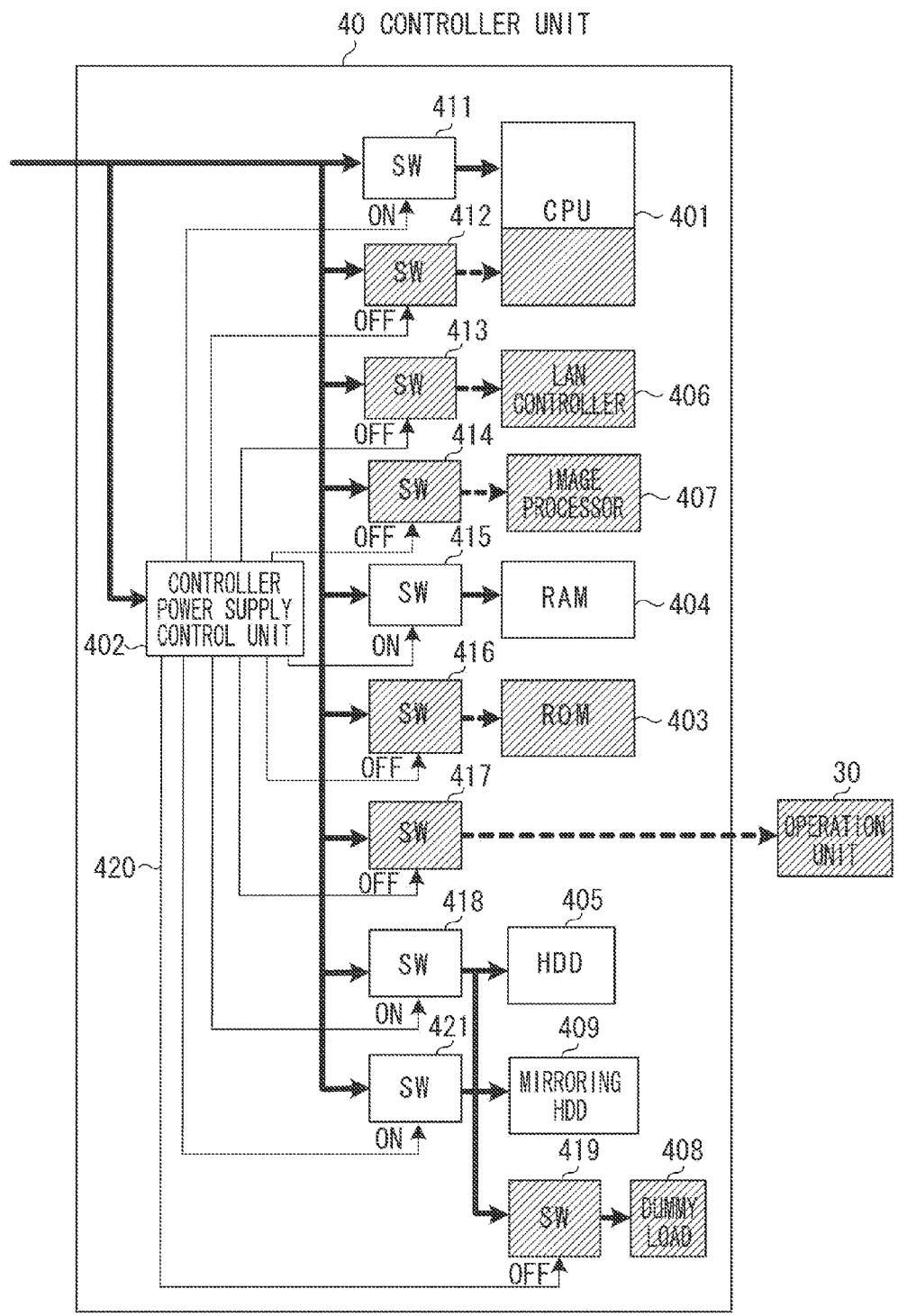
FIG. 13 is a block diagram illustrating a power supply state of an information processing apparatus.

FIG. 13 is a block diagram illustrating a power supply state of the information processing apparatus illustrated in FIG. 12. This example corresponds to the power control state of the controller unit 40 in the second power saving state described in the first exemplary embodiment. In FIG. 13, a shaded area is in a state of being supplied with no power.

The CPU 401 instructs the controller power supply control unit 402 to keep the SW 418 and a SW 421 connected to the HDD 405 and the mirroring HDD 409, respectively, in the ON state. Therefore, the power is supplied to the HDD 405 and the mirroring HDD 409. In this state, the SW 419 remains OFF, not to connect the dummy load 408.

FIG. 14 is a timing chart illustrating a power control state of the information processing apparatus illustrated in FIG. 12. This is an example of the relationship between the voltage supplied to the HDD 405 according to the power control state and the control of the dummy load 408.

In the present exemplary embodiment, when shifting to the second power saving state, a load current occurring in the mirroring HDD 409 is larger than a load current flowing to the dummy load 408, unlike FIG. 10 in the first exemplary embodiment.

In this state, the CPU 401 detects an HDD configuration (connection to the HDD 405 and the mirroring HDD 409) set beforehand in the ROM 403, unlike the first exemplary embodiment. The CPU 401 then instructs the controller power supply control unit 402 to turn on the SW 418 and the SW 421.

In response to this instruction, the controller power supply control unit 402 turns on the SW 418 and the SW 421. This doubles the load current for HDD, so that the power supply voltage supplied to each of the HDD 405 and the mirroring HDD 409 does not exceed the specified input voltage for each of the HDD 405 and the mirroring HDD 409.

Therefore, the CPU 401 instructs the controller power supply control unit 402 to keep the SW 419 connected to the dummy load 408 in the OFF state. The controller power supply control unit 402 then controls the SW 419 to remain OFF by controlling the dummy load SW control signal 420.

As described above, the dummy load can be connected with minimum necessary power, by controlling ON/OFF of the dummy load based on the HDD configuration. Accordingly, power efficiency can be enhanced, and a reduction in the product lifetime of the image formation apparatus due to the lifetime of the HDD can be reduced.

In the present exemplary embodiment, a target for suppressing a load current variation is the HDD, but any device in which a load current variation occurs may be the target.

The exemplary embodiments may each adopt a configuration of being combined with such control that, when the controller power supply control unit 402 causes a shift from the normal state to a lower power state (a DEEP sleep state) than the second power state, timing for stopping the power supplied to a part (e.g., the HDD 405) of a plurality of devices is delayed.

Specifically, the dummy load 408 is controlled to remain in a functioning state, until a predetermined time elapses, in the shift from the normal state to the lower power state than the second power state. Alternatively, the dummy load 408 is controlled to remain in the functioning state, until a voltage value applied to the part of the plurality of devices falls below a specific value, in the shift from the normal state to the lower power state than the second power state. This can satisfy the specified input voltage for the HDD 405.

An exemplary embodiment of the present invention can also be implemented by such processing that a program that implements one or more functions of the above-described exemplary embodiments is supplied to a system or an apparatus via a network or a storage medium. One or more processors in a computer of the system or the apparatus read the program and then execute the read program. Moreover, an exemplary embodiment of the present invention can also be implemented by a circuit (e.g., an application-specific integrated circuit (ASIC)) that implements one or more functions.

According to the exemplary embodiments of the present invention, a variation in a voltage value applied to a part of a plurality of devices according to power saving control can be controlled not to exceed a threshold.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-076711, filed Apr. 3, 2015, which is hereby incorporated by reference herein in its entirety.

What is claimed is:

1. An information processing apparatus including a hard disk drive and a controller that controls the hard disk drive, the information processing apparatus comprising:
    a power supply unit which supplies power to the hard disk drive, the controller, and a load resistance;
    a power controller which shifts the information processing apparatus from a first power state, in which the power is supplied to the hard disk drive and the controller, to a second power state, in which the power is supplied to the hard disk drive while limiting supply of the power to the controller that controls the hard disk drive; and
    a switching unit which switches between stopping supplying the power to the load resistance in the first power state and supplying the power to the load resistance in the second power state.

2. The information processing apparatus according to claim 1, wherein the power controller shifts the information processing apparatus to the second power state when an ON number or an OFF number of the hard disk drive is greater than or equal to a predetermined number.

3. The information processing apparatus according to claim 2,
    wherein, in a case where a condition for shifting the information processing apparatus to a power saving state is satisfied and when the ON number or the OFF number of the hard disk drive is greater than or equal to the predetermined number, the power controller shifts the information processing apparatus to the second power state, and
    wherein, in a case where a condition for shifting the information processing apparatus to the power saving state is satisfied and the ON number or the OFF number of the hard disk drive is less than the predetermined number, the power controller shifts the information processing apparatus to a third power state in which supplying the power to the hard disk drive and the controller is limited.

4. The information processing apparatus according to claim 1,
    wherein the switching unit is a switch, and
    wherein the power controller turns off the switch in the first power state and turns on the switch in the second power state.

5. The information processing apparatus according to claim 1, further comprising another hard disk drive which stores a copy of data stored in the hard disk drive,
    wherein, in a case where the power supply unit supplies the power to the another hard disk drive in the second power state, the switching unit stops supplying the power to the load resistance.

6. The information processing apparatus according to claim 1, wherein, when a predetermined time elapses in the second power state, the power controller stops supplying the power to the hard disk drive.

7. The information processing apparatus according to claim 1, further comprising a storage which stores an upper limit of an ON number or an OFF number of the hard disk drive as a lifetime of the hard disk drive.

8. The information processing apparatus according to claim 1, further comprising a printing unit which prints an image on a sheet.

9. A control method for an information processing apparatus including a hard disk drive, a controller that controls the hard disk drive, and a power supply unit that supplies power to the hard disk drive, the controller, and a load resistance, the control method comprising:

shifting the information processing apparatus from a first power state, in which the power is supplied to the hard disk drive and the controller, to a second power state, in which the power is supplied to the hard disk drive while limiting supply of the power to the controller that controls the hard disk drive; and switching a switching unit between stopping supplying the power to the load resistance in the first power state and supplying the power to the load resistance in the second power state.

10. The control method according to claim 9, wherein the information processing apparatus is shifted to the second power state when an ON number or an OFF number of the hard disk drive is greater than or equal to a predetermined number.

11. The control method according to claim 10, wherein, in a case where a condition for shifting the information processing apparatus to a power saving state is satisfied and the ON number or the OFF number of the hard disk drive is greater than or equal to the predetermined number, the information processing apparatus is shifted to the second power state, and wherein, in a case where a condition for shifting the information processing apparatus to the power saving state is satisfied and the ON number or the OFF number of the hard disk drive is less than the predetermined number, the information processing apparatus is shifted to a third power state in which supplying the power to the hard disk drive and the controller is limited.

12. The control method according to claim 9, further comprising making a copy of data stored in the hard disk drive to store the copy in another hard disk drive, wherein, in a case where the power supply unit supplies the power to the another hard disk drive in the second power state, stopping supply of the power to the load resistance.

13. The control method according to claim 9, wherein, when a predetermined time elapses in the second power state, supplying the power to the hard disk drive is stopped.

14. The control method according to claim 9, further comprising storing an upper limit of an ON number or an OFF number of the hard disk drive as a lifetime of the hard disk drive.

15. The control method according to claim 9, further comprising printing an image on a sheet.

* * * * *